US006887553B1

(12) United States Patent
Heil et al.

(10) Patent No.: US 6,887,553 B1
(45) Date of Patent: May 3, 2005

(54) ROLL OF LONGITUDINALLY FOLDED MASKING MATERIAL

(75) Inventors: Robert H. Heil, New Richmond, WI (US); James F. Pitzen, Maplewood, MN (US); Jeffrey J. Schwab, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 454 days.

(21) Appl. No.: 09/338,095

(22) Filed: Jun. 23, 1999

(51) Int. Cl.[7] .................................................. B23B 1/00
(52) U.S. Cl. ........................ 428/121; 428/40.1; 428/43; 428/121; 428/126; 428/130; 428/906; 156/71; 156/200; 118/505; 200/389
(58) Field of Search .................. 156/200, 71; 428/40.1, 428/130, 126, 43, 906, 121; 118/505; 200/389

(56) References Cited

U.S. PATENT DOCUMENTS

| | | | | |
|---|---|---|---|---|
| 4,263,347 A | | 4/1981 | Banta | 427/282 |
| 4,913,767 A | | 4/1990 | Longworth | 156/527 |
| 4,989,769 A | | 2/1991 | Longworth et al. | 156/527 |
| 4,990,214 A | | 2/1991 | Heil et al. | 156/527 |
| 5,086,683 A | * | 2/1992 | Stedinger | 83/674 |
| 5,113,921 A | | 5/1992 | Pool | 156/71 |
| 5,628,866 A | | 5/1997 | Pool | 156/527 |
| 5,667,626 A | | 9/1997 | Cayford et al. | 156/577 |
| 5,741,389 A | | 4/1998 | Yoshino | 156/272.6 |

FOREIGN PATENT DOCUMENTS

| | | |
|---|---|---|
| AU | 667 853 B | 4/1996 |
| DE | 87 13 459 U | 2/1989 |

* cited by examiner

*Primary Examiner*—Harold Pyon
*Assistant Examiner*—Marc Patterson
(74) *Attorney, Agent, or Firm*—William L. Huebsch

(57) ABSTRACT

A roll of masking material comprising a coiled elongate thin flexible sheet, which sheet has longitudinal folds defining, in some embodiments with elongate edges of the sheet, edges of longitudinally extending portions of said sheet. Those longitudinally extending portions of the sheet include pleat-like portions of the sheet each having opposite major surfaces generally parallel with the axis of the roll, which pleat-like portions are superimposed major surfaces to major surfaces to form a laminate with outermost ones of the superimposed pleat like portions defining the opposite outer surfaces of the laminate. At least some of the edges of the superimposed pleat like portions are positioned generally radially aligned at the first end of the roll, and the longitudinally extending portions of the sheet further including a first radial portion extending radially along the radially aligned edges at the first end of the roll from the edge of one of the outermost pleat like portions at the first end of the roll, and a first distal portion having one of the elongate edges of the sheet and extending for a short distance along the outer surface of the laminate toward the second end of the roll from the edge of the first radial portion opposite the outer most pleat to which the first radial portion is attached. If the sheet has longitudinal edges they may be separably attached, having been formed by longitudinally scoring a tube of the sheet material during manufacture of the roll. Also, a large percentage of the folded sheet can be positioned adjacent one end of the roll to facilitate cutting it on a dispenser.

13 Claims, 6 Drawing Sheets

ROLL OF LONGITUDINALLY FOLDED MASKING MATERIAL

FIELD OF THE INVENTION

The present invention relates to rolls of longitudinally folded masking material for use on the type of dispenser that adheres a length of tape along one edge of the sheet of masking material with the tape having a longitudinal pressure sensitive adhesive covered portion extending past an edge of the sheet of masking material by which the tape and masking material composite can be adhered to a surface to mask that surface, such as during painting; and also relates to methods for making such rolls of masking material.

DESCRIPTION OF THE RELATED ART

U.S. Pat. No. 5,113,921 describes a roll of coiled longitudinally folded masking material for use on the type of dispenser that adheres a length of tape along one edge of the sheet of masking material with the tape having a longitudinal pressure sensitive adhesive covered portion extending past an edge of the sheet of masking material by which the tape and masking material composite can be adhered to a surface to mask that surface, such as during painting. That patent describes and claims a spacing for an edge of an inner second pleat-like portion of the masking material along the inner surface of an outer first pleat-like portion and from an edge of the sheet on that outer pleat-like portion, which spacing restricts contact of the pressure sensitive adhesive on the tape with the inner pleat-like portion when the tape is adhered to the outer pleat-like portion, while the second pleat-like portion provides support for the first pleat-like portion adjacent the first edge of the sheet to assure firm engagement of the pressure sensitive adhesive on the tape with the masking material as the tape and masking material are pulled from the dispensing apparatus to form the tape and masking material composite.

SUMMARY OF THE INVENTION

The present invention also provides a roll of coiled longitudinally folded masking material for use on the type of dispenser that adheres a length of tape along one edge of the sheet of masking material with the tape having a longitudinal pressure sensitive adhesive covered portion extending past an edge of the sheet of masking material by which the tape and masking material composite can be adhered to a surface to mask that surface, such as during painting. The roll can be folded in an alternative novel manner to that described in U.S. Pat. No. 5,113,921 that also restricts contact of the pressure sensitive adhesive on the tape with pleat-like portions of the roll when the tape is adhered to the masking material, while providing support for the portion of the masking material to which the tape is applied to assure firm engagement of the pressure sensitive adhesive on the tape with the masking material as the tape and masking material are pulled from the dispensing apparatus to form the tape and masking material composite.

Certain embodiments of rolls of masking material according to the present invention that are described herein comprise a coiled elongate thin flexible sheet, which sheet has longitudinal folds defining, with elongate edges of the sheet, edges of longitudinally extending portions of the sheet. Those longitudinally extending portions of the sheet include pleat-like portions of the sheet each having opposite major surfaces generally parallel with the axis of the roll, which pleat-like portions are superimposed major surfaces to major surfaces to form a laminate with outermost ones of the superimposed pleat like portions defining the opposite outer surfaces of the laminate. At least some of the edges of the superimposed pleat like portions are positioned generally radially aligned at the first end of the roll. The longitudinally extending portions of the sheet further include a first radial portion extending radially along the radially aligned edges at the first end of the roll from the edge of one of the outermost pleat like portions at the first end of the roll, and a first distal portion having a first elongate edge of the sheet and extending for a short distance along the outer surface of the laminate toward the second end of the roll from the edge of the first radial portion opposite the outer most pleat to which the first radial portion is attached.

The outer most pleat like portion to which the first radial portion is attached can be disposed radially inwardly of the roll from the other one of the outermost superimposed pleat-like portions in the laminate so that the tape is applied to the first distal portion which should have a width axially of the roll that exceeds the width of the portion of the tape that is to be adhered to the sheet of masking material.

Alternatively, the outer most pleat like portion to which the first radial portion is attached can be disposed radially outwardly of the roll from the other one of the outermost pleat-like portions in the laminate so that the tape is applied along a portion of that outer most pleat like portion to which the first radial portion is attached.

The elongate edges of the sheet can be totally separated from each other, or can be separably attached to each other at longitudinally spaced locations so that a workman separates those edges as or after the tape and masking material composite is adhered to a substrate. Such separable attachment of the elongate edges can help to insure the positions of the edges of the longitudinally folded sheet as the tape is applied thereto. Such attachment of the edges can be provided by a series attachments spaced along the lengths of the edges that are defined by slits or holes between the attachments, or can be provided by scoring the masking material to define the edges so that it can be easily torn or separated at the attachments or along the score line. To help such separation, the pleat like portion having one of the edges can, optionally, project slightly farther from the end of the roll opposite the edges so that a workman can easily grasp it along that projecting portion to cause such separation of the edges. A novel method of forming the folded masking material with separably attached edges can include first forming an elongate tube of polymeric material by well known extruding and air pressure stretching techniques, then forming a line of weakness along the length of the tube (e.g., by a skip slitting or scoring device or a device that forms a line of spaced openings), and then longitudinally folding the sheet and coiling it to form the roll of masking material with attachments along its longitudinal edges.

Also, alternatively, the pleat-like portions in the laminate can be positioned with edges of at least some of the pleat like portions generally radially aligned at the second end of the roll, and the longitudinally extending portions of the sheet can further include a second radial portion extending from the edge of one of the outermost pleat like portions at the second end of the roll radially along the radially aligned edges at the second end of said roll and a second distal portion having one of said elongate edges of the sheet and extending from the edge of the first radial portion opposite the outer most pleat to which the second radial portion is attached for a short distance along the outer surface of the laminate toward the first end of the roll. This configuration allows tape to be applied along either or both of the edges of the sheet of masking material using, for example, the dispenser described in U.S. Pat. No. 5,113,921 or the dispenser described in U.S. Pat. No. 5,628,866, the content whereof is incorporated herein by reference.

An embodiment of a roll of masking material can also be provided that comprises a coiled elongate thin flexible sheet without longitudinal edges (i.e., formed by flattening a tube of the sheet material), which sheet has longitudinal folds defining edges of longitudinally extending portions of the sheet. Those longitudinally extending portions of the sheet include pleat-like portions of the sheet each having opposite major surfaces generally parallel with the axis of the roll, which pleat-like portions are superimposed major surfaces to major surfaces to form a laminate with outermost ones of the superimposed pleat like portions defining the opposite outer surfaces of the laminate. At least some of the edges of the superimposed pleat like portions are positioned generally radially aligned at the first end of the roll. The longitudinally extending portions of the sheet further include a first radial portion extending radially along the radially aligned edges at the first end of the roll between the edges of one of the outermost pleat like portions at the first end of the roll.

BRIEF DESCRIPTION OF THE DRAWING

The present invention will be further described with reference to the accompanying drawing wherein like reference numerals refer to like parts in the several views, and wherein.

DETAILED DESCRIPTION

Figure 1:
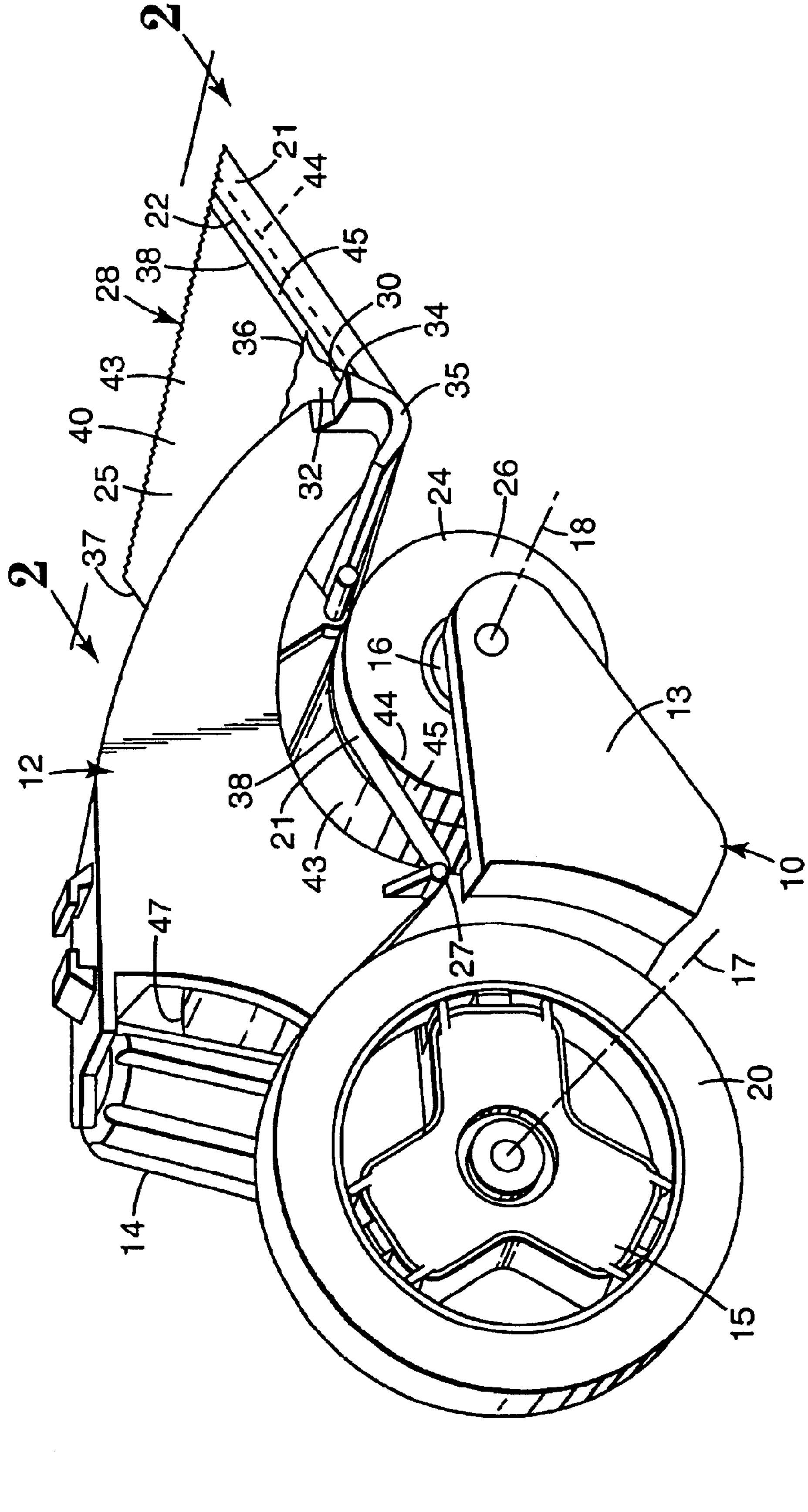
FIG. 1 is a perspective view of a dispensing apparatus or dispenser on which is mounted a first embodiment of a roll of masking material according to the present invention.

Referring now to FIG. 1 of the drawing, there is shown a dispensing apparatus or dispenser 10 for use in dispensing sheet masking material 25 having a length of pressure sensitive adhesive coated tape 21 adhered along one edge thereof using a first embodiment of a roll 24 of masking material 25 according to the present invention. The dispenser 10 is of the type described in U.S. Pat. No. 4,990,214 (the content whereof is incorporated herein by reference), one embodiment of which is sold by Minnesota Mining and Manufacturing Company, St., Paul, Minn. under the trade designation "HandMasker" (t.m.) M3000 Dispenser. Generally, that dispenser 10 includes a polymeric frame 12 including a hub support frame member 13 and a handle 14 adopted for manual engagement to manipulate the dispenser 10. First and second hubs 15 and 16 are mounted on the hub support frame member 13 for rotation about spaced generally parallel axes 17 and 18. The first hub 15 (described more fully in U.S. Pat. No. 5,667,626, the content whereof is incorporated herein by reference) is adapted to receive a roll 20 of the tape 21 and to position a first edge 22 of a length of the tape 21 withdrawn from the roll 20 at a first predetermined position axially with respect to the first and second hubs 15 and 16 with the opposite second edge of that withdrawn length of tape 21 projecting past the frame 12. The second hub 16 is adapted to receive the roll 24 of masking material 25 and to position the first end 26 of the roll 24 of masking material 25 at a second predetermined position axially with respect to the first and second hubs 15 and 16 with the width of the length of tape 21 extending from the first position past the second position and the roll 24 of masking material 25 extending from the second position past the first position. A portion of the length of tape 21 along the first edge 22 of the length of tape 21 and a portion of the length of masking material 25 along the first end 26 of the roll 24 of masking material 25 are both positioned between those first and second positions. The dispenser 10 includes means including a guide pin 27 that defines a path for the length of tape 21 from the roll 20 of tape 21 to the periphery of the roll 24 of masking material 25 where the portion of tape 21 along the first edge 22 of the length of tape 21 is adhered to the portion of the masking material 25 along the first end 26 of the roll 24 of masking material 25. Such adhesion of the tape 21 to the masking material 25 along the periphery of the roll 24 of masking material 25 forms a composite masking sheet material 28 having opposite edges defined by the second edges of the length of tape 21 and the length of masking material 25 and an exposed portion of the coating of pressure sensitive adhesive along the second edge on the length of tape 21 along one major surface of the composite masking sheet material 28 so that the exposed portion of the coating of adhesive can be adhered along a surface to be masked to hold the composite masking sheet 28 in a desired position.

The frame 12 defines a passageway on the device 10 through which a person may pull the composite masking sheet material 28 from the supply of composite masking sheet material 28 formed at the periphery of the roll 24 of masking material 25. The dispenser 10 includes a cut off blade assembly comprising a thin metal blade 30 (e.g., made of 0.018 inch thick sheet steel). The metal blade 30 includes an attachment portion 34 that is curved along its length to have a generally J-shaped cross section and is removeably attached to a member 35 of the frame 12. The cut off blade 30 extends generally parallel to the axes 17 and 18 of the hubs 15 and 16 and defines a first side of the passageway. A user of the dispenser 10 can manually tension the composite masking sheet material 28 being pulled from the roll 24 around a row of similarly shaped projecting teeth 36 included in the blade 30. The teeth 36 will then pierce and transversely sever the tensioned composite masking sheet material 28 along a cutting edge on the blade 30 along the teeth 36 as that composite masking sheet material 28 is pulled away from the dispenser 10.

The teeth 36 on the blade 30 are similar in shape to the teeth described in U.S. Pat. No. 4,913,767 (the content whereof is incorporated herein by reference) and can be made by the method described in that patent. Points of the teeth 36 can pierce the composite masking sheet material 28 when that sheet material 28 is pulled across the teeth 36, and further tension applied on the composite masking sheet material 28 will cause the teeth 36 to further penetrate the composite masking sheet material 28 until the composite masking sheet material 28 is completely severed by the cutting edge along the teeth 36. A blade guard (not illustrated) such as that described in U.S. Pat. No. 4,989,769 (the content whereof is incorporated herein by reference) can be used to protect a person using the dispenser 10 from the teeth 36 on the blade 30.

Figure 2:
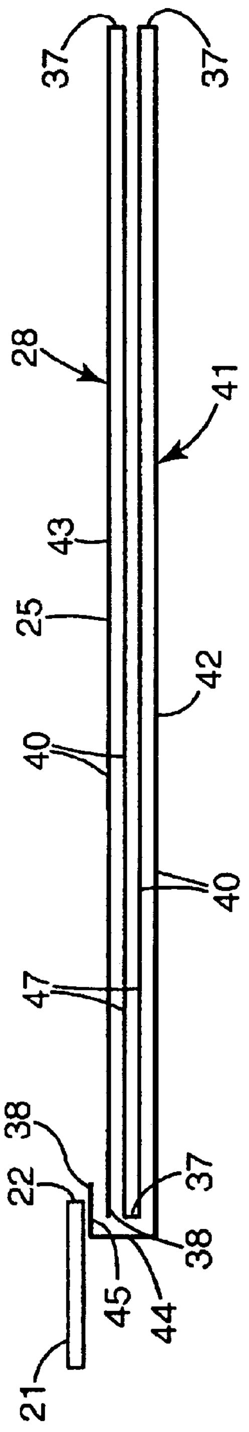
FIG. 2 is an enlarged fragmentary view taken along the line 2—2 of FIG. 1 illustrating a folded length of masking material from the roll of masking material shown in FIG. 1, to which length of masking material a length of tape has been applied by the dispenser of FIG. 1.

As is best seen in FIG. 2, the masking material 25 in the roll 24 is a coiled elongate thin flexible sheet of polymeric material (e.g., 0.01 millimeter thick polyethylene, 12 to 144 inches or 30 to 366 centimeters wide, to which has been added a small amount of titanium dioxide to color the masking material 25), which masking material 25 has longitudinal folds 37 defining, with elongate totally separated longitudinal edges 38 of the sheet 25, edges of longitudinally extending portions of the sheet 25. Those longitudinally extending portions of the sheet 25 include pleat-like portions 40 of the sheet 25 each having opposite major surfaces generally parallel with an axis of the roll 24, which pleat-like portions 40 are superimposed major surfaces to major surfaces to form a laminate 41 with outermost ones 42 and 43 of the superimposed pleat like portions 40 defining the opposite outer surfaces of the laminate 41. At least some of the edges of the superimposed pleat like portions 40 are positioned generally radially aligned at the first end 26 of the roll 24. The longitudinally extending portions of the sheet 25 further include a first radial portion 44 extending radially along and in contact with the radially aligned edges at the first end 26 of the roll 24 from the edge of one of the outermost pleat like portions 42 at the first end 26 of the roll 24, and a first distal portion 45 having one of the elongate edges 28 of the sheet 25 and extending for a short distance along the outer surface of the laminate 41 toward a second end 47 of the roll 24 from the edge of the first radial portion 44 opposite the outer most pleat-like portion 42 to which the first radial portion 44 is attached. The outer most pleat like portion 42 to which the first radial portion 44 is attached is disposed radially inwardly of the roll 24 from the other one of the outermost superimposed pleat-like portions 43 in the laminate 41 so that the tape 21 is applied to the first distal portion 45 which should have a width axially of the roll 24 that exceeds the width of the portion of the tape 21 that is to be adhered to the sheet 25 of masking material. As illustrated, the pleat like portions 40 in the laminate 41 also include two inner pleat like portions 47 between the outermost pleat like portions 42 and 43, which inner pleat like portions 47 extend for almost the full length of the roll 24. Alternatively the roll 24 could include only one or no such inner pleat like portions 47, or could include one, two or more additional inner pleat like portions 47 than those illustrated.

Figure 3:
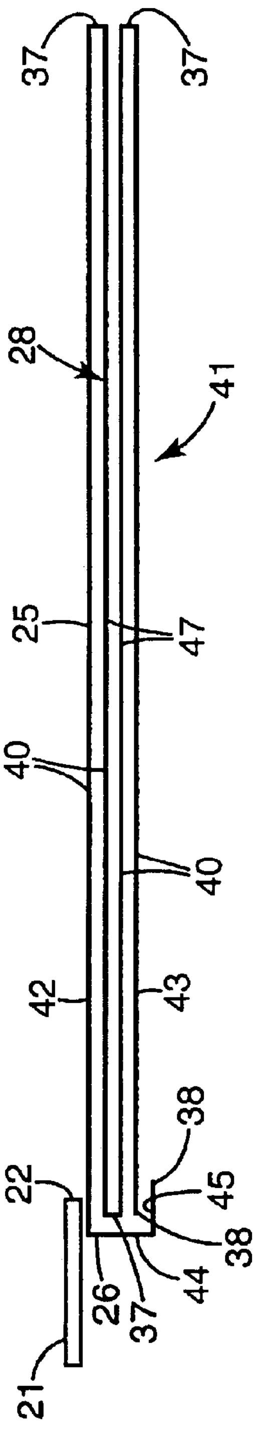
FIG. 3 is an enlarged view generally corresponding to FIG. 2 that illustrates a folded length of masking material from a second embodiment of a roll of masking material according to the present invention, to which length of masking material has been adhered a length of tape as by the dispenser of FIG. 1.

Alternatively, as is illustrated in FIG. 3, the longitudinally folded masking material 25 can be wound to form a second alternate embodiment of a roll of masking material according to the present invention in which the outer most pleat like portion 42 to which the first radial portion 44 is attached is disposed radially outwardly of the roll from the other one of the outermost pleat-like portions 43 in the laminate 41 so that when the roll is used on the dispenser 10 as described above, the tape 21, as illustrated, is applied along a portion of that outer most pleat like portion 43 to which the first radial portion 44 is attached.

Figure 4:
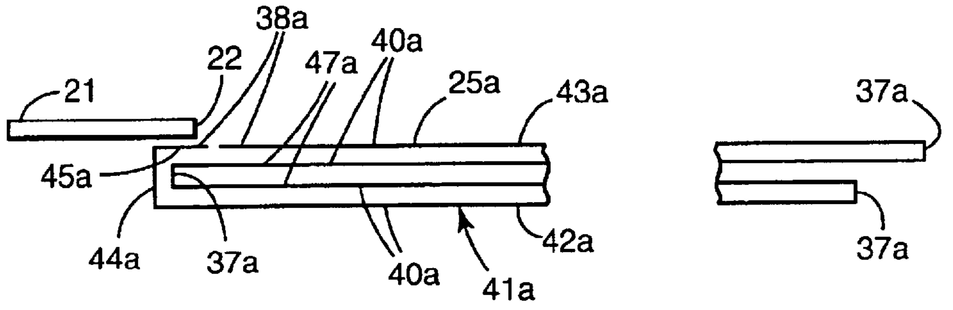
FIG. 4 is an enlarged fragmentary view generally corresponding to FIG. 2 that illustrates a folded length of masking material from a third embodiment of a roll of masking material according to the present invention, to which length of masking material has been adhered a length of tape as by the dispenser of FIG. 1.
Figure 5:
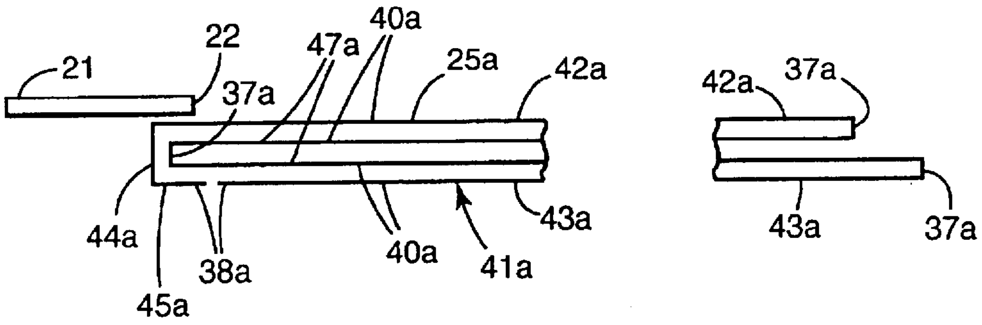
FIG. 5 is a view corresponding to FIG. 2 that illustrates a folded length of masking material from a fourth embodiment of a roll of masking material according to the present invention, to which length of masking material has been adhered a length of tape as by the dispenser of FIG. 1.

Also, as is illustrated in FIGS. 4 and 5, the first and second longitudinal edges **38*a* of the folded masking material 25*a* can be separably attached together by separable attachment means with those edges 38*a* positioned as illustrated in FIGS. 4 and 5 (in FIGS. 4 and 5 structural features of the folded masking material 25*a* corresponding to those features described above with reference to FIGS. 1, 2, and 3 are identified with the same reference numerals to which have been added the suffix "a"). Such separable attachment means can, for example be provided by attachments about one sixteenth inch or 0.16 centimeter in length spaced about every inch or 2.5 centimeters along the lengths of the edges 38*a* by slits between the attachments, which attachments are formed by skip slitting a tube of the masking material 25 made by a tubular extruder. Alternatively, such separable attachment could be provided by a series of holes between such attachments, or could be provided by scoring the masking material so that it can be easily torn along the score line. Such separable attachment means defines the longitudinal edges 38*a* of the masking material 25*a* and helps to insure a proper relative orientation between the edges 38*a* of the folded masking material 25*a* when the tape 21 is applied as by the dispenser 10. After the tape 21 is applied as by the dispenser 10, the workman using the dispenser 10 can easily separate those edges 38*a* along the separable attachment means as, or after, the tape 21 of the composite masking material 28*a* is adhered to a substrate. To help such separation, the pleat like portion 43*a* having one of the edges 38*a* can, optionally, project slightly farther (e.g., 1 inch or 2.54 centimeters) from the end of the roll opposite the edges 38*a* as is illustrated in FIGS. 4 and 5 so that the workman can easily grasp it along that projecting portion to cause such separation of the edges 38*a***.

Figure 11:
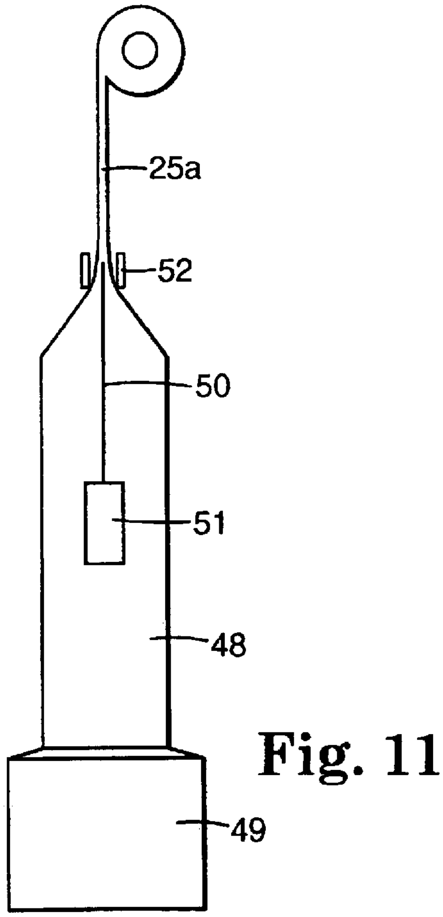
FIG. 11 is a view schematically illustrating a method according to the present invention for making the rolls of masking material illustrated in FIGS. 4 and 5.

The folded masking material **25*a* described above with reference to FIGS. 4 and 5 can be made by a method schematically illustrated in FIG. 11 of first forming an elongate tube 48 of polymeric material by well known extruding and air pressure stretching techniques using an extruder 49. That tube 48 could then be slit and longitudinally folded in a conventional known manner to form the folded masking material 25 illustrated in FIGS. 1, 2, and 3. As is illustrated in FIG. 11, however, a line of weakness 50 is formed along its length by a device 51 (e.g., by a skip slitting or scoring device or a device that forms a line of spaced openings), and the tube 48 is then longitudinally folded by conventional folding structures 52 and coiled to form the roll of masking material 25*a* with attachments along its longitudinal edges 38***a* that is described with reference to FIGS. 4 and 5.

It is preferred to have corona treatment on the surface of the masking material 25 or 25*a* that will be outermost after the masking material 25 or 25*a* is adhered over a substrate by the tape 21. Such corona treatment facilitates printing indicia (e.g., "WET PAINT") on that surface of the masking material and makes paint more easily adhere to that surface of the masking material. The outer surface of the tube can be corona treated (as is conventional) to form the folded masking material illustrated in FIGS. 3 and 5, but the inner surface of the tube must be corona treated or the surfaces of the tube must be reversed after its outer surface is corona treated to form the folded masking material illustrated in FIG. 1, 2, or 4.

Figure 6:
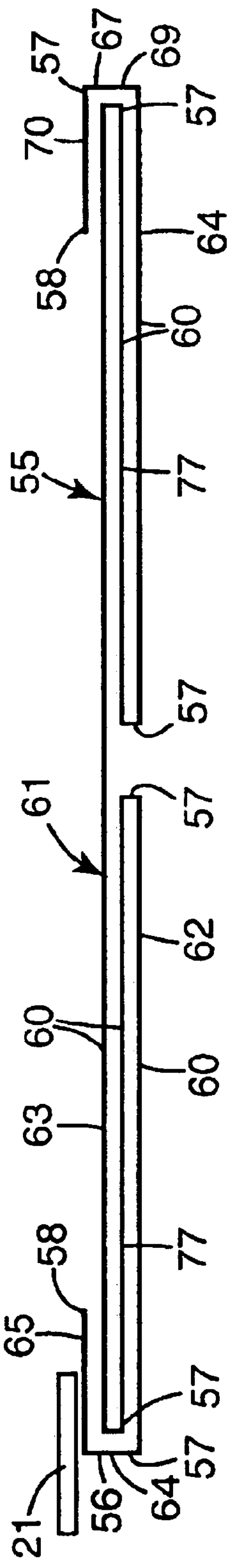
FIGS. 6, 7, and 8 are views generally corresponding to FIG. 2 that illustrate a folded length of masking material from a fifth embodiment of a roll of masking material according to the present invention, and which views illustrate tape applied along a first edge, along a second edge, and along both edges of the length of masking material, respectively.
Figure 7:
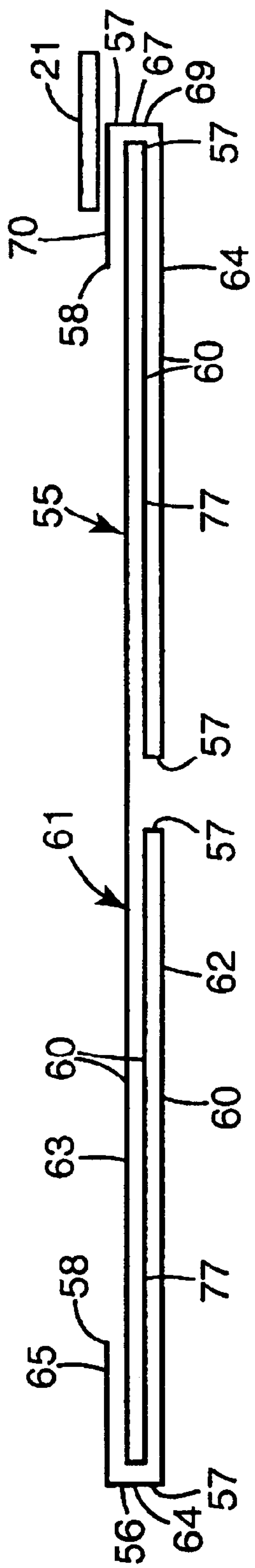
Figure 8:
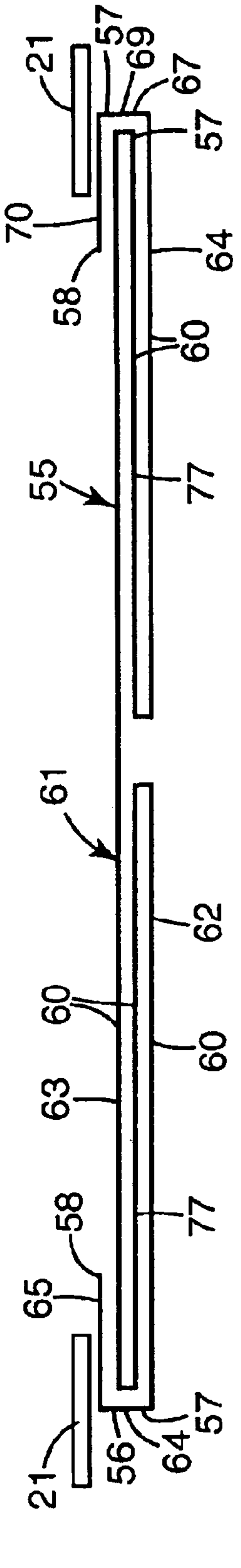

FIGS. 6, 7, and 8 illustrate an alternative longitudinal fold pattern for a coiled elongate thin flexible elongate sheet 55 of polymeric material that can be used to form a fifth alternate embodiment of a roll of masking material according to the present invention. The sheet 55 has longitudinal folds 57 defining, with elongate edges 58 of the sheet 55, edges of longitudinally extending portions of the sheet 55. Those longitudinally extending portions of the sheet 55 include pleat-like portions 60 of the sheet 55 each having opposite major surfaces generally parallel with an axis of the roll, which pleat-like portions 60 are superimposed major surfaces to major surfaces to form a laminate 61 with outermost ones 62, 63 and 64 of the superimposed pleat like portions 60 defining the opposite outer surfaces of the laminate 61. At least some of the edges of the superimposed pleat like portions 60 are positioned generally radially aligned at a first end 56 of the roll. The longitudinally extending portions of the sheet 55 further include a first radial portion 64 extending radially along and in contact with the radially aligned edges at the first end 56 of the roll from the edge of one of the outermost pleat like portions 62 at the first end 56 of the roll, and a first distal portion 65 having one of the elongate edges 58 of the sheet 55 and extending for a short distance along the outer surface of the laminate 61 toward a second end 67 of the roll from the edge of the first radial portion 64 opposite the outer most pleat-like portion 62 to which the first radial portion 64 is attached. As illustrated, the outer most pleat like portion 62 to which the first radial portion 64 is attached is disposed radially inwardly of the roll from the other one of the outermost superimposed pleat-like portions 63 in the laminate 61 so that the tape 21 is applied to the first distal portion 65 which should have a width axially of the roll that exceeds the width of the portion of the tape 21 that is to be adhered to the sheet 55 of masking material. The pleat-like portions in the laminate are also positioned with edges of at least some of the pleat like portions 60 generally radially aligned at the second end 67 of the roll, and the longitudinally extending portions of the sheet 55 further include a second radial portion 69 extending from the edge of one of the outermost pleat like portions 64 at the second end 67 of the roll radially along and in contact with the radially aligned edges at the second end 67 of said roll, and a second distal portion 70 having one of the elongate edges 58 of the sheet and extending from the edge of the first radial portion 70 opposite the outer most pleat 64 to which the second radial portion 69 is attached for a short distance along the outer surface of the laminate 61 toward the first end 56 of the roll. This configuration allows tape 21 to be applied along either one or both of the edges 58 of the sheet 55 of masking material as is illustrated in FIGS. 6, 7, and 8 by using, for example, either the dispensing apparatus described in U.S. Pat. No. 4,990,214 or the dispensing apparatus described in U.S. Pat. No. 5,628,866 (the content whereof is incorporated herein by reference). As illustrated, the laminate 61 also includes two inner pleat like portions 77 between the outermost pleat like portions 62, 63, and 64, which inner pleat like portions 77 each extend for about half the full length of the roll. Alternatively the roll could include four or more additional inner pleat like portions 77 than those illustrated.

Alternatively, the longitudinally folded sheet of masking material 55 can be wound into a roll with the outer most pleat like portions 62 and 64 to which the first and second radial portions 64 and 69 are attached disposed radially outwardly of the roll from the other outermost pleat-like portions 63 in the laminate 61 so that the lengths tape 21 are applied along portions of those outer most pleat like portions 64 and 67 to which the radial portions 64 and 67 are attached.

Figure 9:
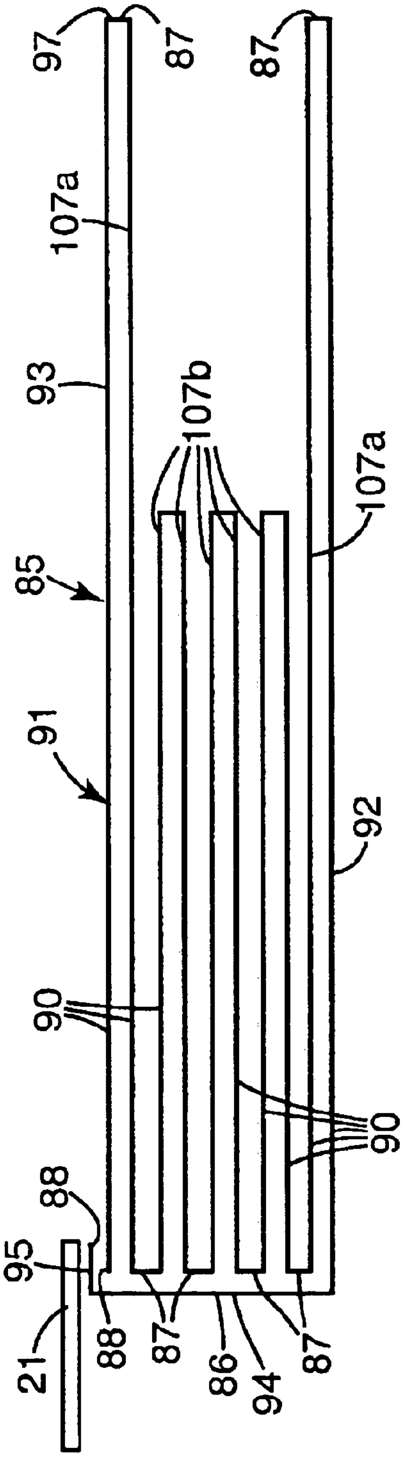
FIG. 9 is a view generally corresponding to FIG. 2 that illustrates a folded length of masking material from a sixth embodiment of a roll of masking material according to the present invention, to which length of masking material has been adhered a length of tape as by the dispenser of FIG. 1.

FIG. 9 illustrates a third alternative longitudinal fold pattern for a coiled elongate thin flexible elongate sheet 85 of polymeric material in a roll of masking material according to the present invention. The sheet 85 has longitudinal folds 87 defining, with elongate edges 88 of the sheet 85, edges of longitudinally extending portions of the sheet 85. Those longitudinally extending portions of the sheet 85 include pleat-like portions 90 of the sheet 85 each having opposite major surfaces generally parallel with an axis of the roll, which pleat-like portions 90 are superimposed major surfaces to major surfaces to form a laminate 91 with outermost ones 92 and 93 of the superimposed pleat like portions 90 defining the opposite outer surfaces of the laminate 91. At least some of the edges of the superimposed pleat like portions 90 are positioned generally radially aligned at a first end 86 of the roll. The longitudinally extending portions of the sheet 85 further include a first radial portion 94 extending radially along and in contact with the radially aligned edges at the first end 86 of the roll from the edge of one of the outermost pleat like portions 92 at the first end 86 of the roll, and a first distal portion 95 having one of the elongate edges 88 of the sheet 85 and extending for a short distance along the outer surface of the laminate 91 toward a second end 97 of the roll from the edge of the first radial portion 94 opposite the outer most pleat-like portion 92 to which the first radial portion 94 is attached. As illustrated, the outer most pleat like portion 92 to which the first radial portion 94 is attached is disposed radially inwardly of the roll from the other one of the outermost superimposed pleat-like portions 93 in the laminate 91 so that the tape 21 is applied (e.g., as by the dispenser 10 described above) to the first distal portion 95 which should have a width axially of the roll that exceeds the width of the portion of the tape 21 that is to be adhered to the sheet of masking material. As illustrated, the laminate 91 also includes eight inner pleat like portions 107*a* and 107*b* between the outermost pleat like portions 92 and 93, which inner pleat like portions include the six inner pleat like portions 107*a* that each extend for significantly less than (e.g., about two thirds) the full length of the roll from the first end 86 of the roll. This use of shortened pleat like portions 107*b* adjacent the first end 86 of the roll provides a significant improvement in the amount and pattern of force that is required from a person to cut the laminate 91 on the cutting blade 30 of the dispenser 10 described above (i.e., the "HandMasker"(t.m) M3000 Dispenser) compared to cutting sheet material of the same material, thickness and overall width between its longitudinal edges that is longitudinally folded into a laminate of the same width that is formed of pleat like portions, all of which extend essentially the entire axial length of the roll. Typically, the laminate 91 with the tape 21 applied thereto by the dispenser 10 is cut by grasping it along the edge to which the tape 21 is applied, and pulling it sequentially into cutting engagement with a cutting edge along the teeth 36 on the blade 30 beginning with the teeth 36 adjacent the tape 21. The force applied to pull the laminate 91 of sheet material 88 into sequential cutting engagement with the teeth 36 is most easily applied during the initial cutting of the laminate 91 because the force is then more directly applied from the sheet material 88 to the cutting edge along the teeth 36 and the cutting edge on the blade 30 than when cutting is occurring along the opposite end of the laminate 91. When cutting is occurring along the opposite end of the laminate 91 the force applied to cause sequential cutting of the composite masking sheet material 28 is applied transversely across the freshly cut edge of the laminate 91, so that some of the applied force is lost to stretching and/or de-lamination of the laminate 91. For a given width of sheet material of the same thickness, cutting the laminate 91 is easier if a higher percentage of the width of the sheet material to be cut is positioned adjacent the first end 86 of the roll. At least 65 percent, better over 75 percent, and preferably over 80 percent of the width of the sheet material 88 in the pleat like portions forming the laminate 91 should be within the ⅔ of the length of the roll from its first end 86. This improvement in cutting will also be provided in sheet material longitudinally folded to make a laminate in the manner described in U.S. Pat. No. 5,113,921 if it is also folded so that the above indicated percentages of the width of the sheet material in the pleat like portions forming the laminate are within two thirds of the length of the roll from its first end at which cutting of the laminate begins.

Figure 10:
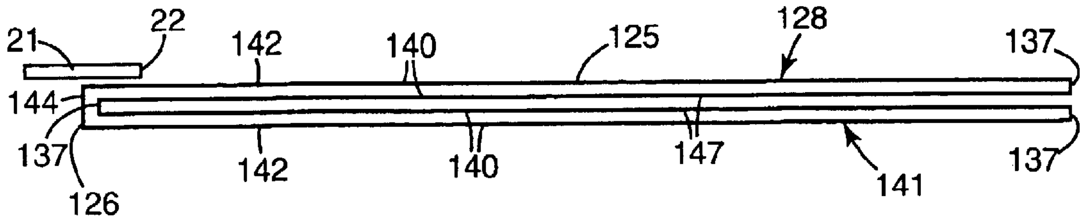
FIG. 10 is a view generally corresponding to FIG. 2 that illustrates a folded length of masking material from a seventh embodiment of a roll of masking material according to the present invention, to which length of masking material has been adhered a length of tape as by the dispenser of FIG. 1.

FIG. 10 illustrates an alternate embodiment for a roll of masking material 125 which is a coiled elongate thin flexible sheet of polymeric material in the form of a flattened tube (e.g., a tube of 0.005 to 0.002 millimeter thick high density polyethylene to which is added a small amount of titanium dioxide, 12 to 144 inches or 30 to 366 centimeters wide when flattened in two layers). The masking material 125 has longitudinal folds 137 defining edges of longitudinally extending portions of the sheet 125. Those longitudinally extending portions of the sheet 125 include pleat-like portions 140 of the sheet 125 each having opposite major surfaces generally parallel with an axis of the roll, which pleat-like portions 140 are superimposed major surfaces to major surfaces to form a laminate 141 with outermost ones 142 of the superimposed pleat like portions 140 defining the opposite outer surfaces of the laminate 141. At least some of the edges of the superimposed pleat like portions 140 are positioned generally radially aligned at the first end 126 of the roll. The longitudinally extending portions of the sheet 125 further include a radial portion 144 extending radially along and in contact with the radially aligned edges at the first end 126 of the roll between the edges of the outermost pleat like portions 142. As illustrated, the pleat like portions 140 in the laminate 141 also include two inner pleat like portions 147 between the outermost pleat like portions 142 and 143, which inner pleat like portions 147 extend for almost the full length of the roll. Alternatively the laminate 141 could include no such inner pleat like portions 147, or could include two, four, or more additional inner pleat like portions 147 than those illustrated. The sheet 125 can have tape 21 applied along one edge thereof as illustrated (e.g., as by the dispenser 10), and can thereafter be adhered along a substrate by the tape 21 and unfolded to provide two layers of the masking material 125 extending over the substrate.

The present invention has now been described with reference to several embodiments and possible modifications thereof. It will be apparent to those skilled in the art that many changes can be made in the embodiments described without departing from the scope of the present invention. Thus, the scope of the present invention should not be limited to the structures described in this application, but only by the structures described by the language of the claims and the equivalents thereof.

What is claimed is:

1. A roll of masking material having an axis, first and second axially spaced ends, and a predetermined width between said spaced ends, said roll of masking material comprising a coiled elongate sheet, said sheet-having opposite first and second elongate edges, having longitudinal folds defining, with said elongate edges, edges of longitudinally extending portions of said sheet, said longitudinally extending portions of said sheet including pleated portions of said sheet each having opposite major surfaces generally parallel with said axis, said pleated portions being superimposed major surfaces to major surfaces to form a laminate with outermost ones of said superimposed pleated portions defining the opposite outer surfaces of said laminate, and at least some of the edges of said superimposed pleated portions being positioned generally radially aligned at said first end of said roll, said longitudinally extending portions of said sheet further including a first radial portion extending radially of said roll along said radially aligned edges at said first end of said roll from the edge of one of the outermost pleated portions at said first end of said roll and a first distal portion having said first elongate edge of said sheet and extending for a distance less than said predetermined width along the outer surface of the laminate toward the second end of the roll from the edge of said first radial portion opposite the outer most pleated portion to which the first radial portion is attached; said one of the outer most pleated portions to which the first radial portion is attached being disposed radially outwardly of the roll from the other one of said outermost pleated portions in the laminate.

2. A roll of masking material having an axis, first and second axially spaced ends, and a predetermined width between said spaced ends, said roll of masking material comprising a coiled elongate sheet, said sheet having opposite first and second elongate edges, having longitudinal folds defining, with said elongate edges, edges of longitudinally extending portions of said sheet, said longitudinally extending portions of said sheet including pleated portions of said sheet each having opposite major surfaces generally parallel with said axis, said pleated portions being superimposed major surfaces to major surfaces to form a laminate with outermost ones of said superimposed pleated portions defining the opposite outer surfaces of said laminate, and at least some of the edges of said superimposed pleated portions being positioned generally radially aligned at said first end of said roll, said longitudinally extending portions of said sheet further including a first radial portion extending radially of said roll along said radially aligned edges at said first end of said roll from the edge of one of the outermost pleated portions at said first end of said roll and further including a first distal portion extending for a distance less than said predetermined width toward the second end of the roll from the edge of said first radial portion opposite the outer most pleated portion to which the first radial portion is attached, the edge of said first distal portion opposite said first radial portion being said first elongate edge of the sheet, said second elongate edge of said sheet being the edge adjacent the first end of said roll of the outermost pleated portion opposite the outermost pleated portion to which said first radial portion is attached, and said first elongate edge of said sheet along said first distal portion being separably attached to said second elongate edge of said sheet.

3. A roll of masking material according to claim 2 wherein the outermost pleated portion having said second elongate edge of said sheet includes a portion projecting beyond the other of said pleated portions at the second end of said roll to afford manual engagement of said projecting portion and thereby facilitate separation of said first and second elongate edges of said sheet.

4. A roll of masking material having an axis, first and second axially spaced ends, and a predetermined width between said spaced ends, said roll of masking material comprising a coiled elongate sheet, said sheet having opposite first and second elongate edges, having longitudinal folds defining, with said elongate edges, edges of longitudinally extending portions of said sheet, said longitudinally extending portions of said sheet including pleated portions of said sheet each having opposite major surfaces generally parallel with said axis, said pleated portions being superimposed major surfaces to major surfaces to form a laminate with outermost ones of said superimposed pleated portions defining the opposite outer surfaces of said laminate, and at least some of the edges of said superimposed pleated portions being positioned generally radially aligned at said first end of said roll, said longitudinally extending portions of said sheet further including a first radial portion extending radially of said roll along said radially aligned edges at said first end of said roll from the edge of one of the outermost pleated portions at said first end of said roll and further including a first distal portion extending for a distance less than said predetermined width along the outer surface of the laminate toward the second end of the roll from the edge of said first radial portion opposite the outer most pleated portion to which the first radial portion is attached, the edge of said first distal portion opposite said first radial portion being said first elongate edge of the sheet; said pleated portions in said laminate being positioned with edges of at least some of said pleated portions generally radially aligned at said second end of said roll, and said longitudinally extending portions of said sheet further include a second radial portion extending from the edge of one of the outermost pleated portions at said second end of said roll radially of said roll along said radially aligned edges at said second end of said roll and a second distal portion extending from the edge of said second radial portion opposite the outer most pleat to which the second radial portion is attached for a distance less than said predetermined width along the outer surface of the laminate toward the first end of the roll, the edge of said second distal portion opposite said second radial portion being said second elongate edge of the sheet.

5. A roll of masking material according to claim 4 wherein said outer most pleated portions to which the first and second radial portions are attached are disposed radially inwardly of the roll from the other one of said outermost pleat-like portions in the laminate.

6. A roll of masking material according to claim 4 wherein said outer most pleated portions to which the first and second radial portions are attached are disposed radially outwardly of the roll from the other one of said outermost pleat-like portions in the laminate.

7. A roll of masking material according to claim 1 wherein at least 75 percent of the width of the sheet material in the pleated portions forming the laminate between said edges is within the ⅔ of the axial length of the roll from said first end.

8. A roll of masking material according to claim 1 wherein at least 80 percent of the width of the sheet material in the pleated portions forming the laminate between said edges is within the ⅔ of the axial length of the roll from said first end.

9. A roll of masking material having an axis and first and second axially spaced ends, said roll of masking material comprising a coiled elongate sheet, said sheet having opposite first and second elongate edges, having longitudinal folds defining, with said elongate edges, edges of longitudinally extending portions of said sheet, said longitudinally extending portions of said sheet including pleated portions of said sheet each having opposite major surfaces generally parallel with said axis, said pleated portions being superimposed major surfaces to major surfaces to form a laminate with outermost ones of said superimposed pleated portions defining the opposite outer surfaces of said laminate, said first elongate edge of said sheet being at said first end of said roll and at least some of the edges of said superimposed pleated portions being positioned generally radially aligned at said first end of said roll to support said first elongate edge of said sheet, at least 75 percent of the width of the sheet material in the pleated portions forming the laminate between said edges is within the ⅔ of the axial length of the roll from said first end.

10. A roll of masking material according to claim 9 wherein at least 80 percent of the width of the sheet material in the pleated portions forming the laminate between said edges is within the ⅔ of the axial length of the roll from said first end.

11. A roll of masking material having an axis and first and second axially spaced ends, said roll of masking material comprising a coiled elongate sheet, said sheet having opposite first and second elongate edges joined along a line of weakness affording manual separation of said edges, and having longitudinal folds defining, with said elongate edges, edges of longitudinally extending portions of said sheet.

12. A roll of masking material according to claim 11 wherein said sheet is slit to define said first and second elongate edges and said line of weakness joining said first and second elongate edges of the sheet.

13. A roll of masking material according to claim 11 wherein said sheet is scored to define said first and second elongate edges and said line of weakness joining said first and second elongate edges of the sheet.

* * * * *

UNITED STATES PATENT AND TRADEMARK OFFICE

CERTIFICATE OF CORRECTION

PATENT NO. : 6,887,553 B1
APPLICATION NO. : 09/338095
DATED : May 3, 2005
INVENTOR(S) : Robert H. Heil It is certified that error appears in the above-identified patent and that said Letters Patent is hereby corrected as shown below:

<u>Title Page</u>
ABSTRACT, delete
"A roll of masking material comprising a coiled elongate thin flexible sheet, which sheet has longitudinal folds defining, in some embodiments with elongate edges of the sheet, edges of longitudinally extending portions of said sheet. Those longitudinally extending portions of the sheet include pleat-like portions of the sheet each having opposite major surfaces generally parallel with the axis of the roll, which pleat-like portions are superimposed major surfaces to major surfaces to form a laminate with outermost ones of the superimposed pleat like portions defining the opposite outer surfaces of the laminate. At least some of the edges of the superimposed pleat like portions are positioned generally radially aligned at the first end of the roll, and the longitudinally extending portions of the sheet further including a first radial portion extending radially along the radially aligned edges at the first end of the roll from the edge of one of the outermost pleat like portions at the first end of the roll, and a first distal portion having one of the elongate edges of the sheet and extending for a short distance along the outer surface of the laminate toward the second end of the roll from the edge of the first radial portion opposite the outer most pleat to which the first radial portion is attached. If the sheet has longitudinal edges they may be separably attached, having been formed by longitudinally scoring a tube of the sheet material during manufacture of the roll. Also, a large percentage of the folded sheet can be positioned adjacent one end of the roll to facilitate cutting it on a dispenser."

and insert
--A roll of masking material comprising a coiled elongate thin flexible sheet, which sheet has longitudinal folds defining, in some embodiments with elongate edges of the sheet, edges of longitudinally extending portions of said sheet.

UNITED STATES PATENT AND TRADEMARK OFFICE

CERTIFICATE OF CORRECTION

PATENT NO. : 6,887,553 B1
APPLICATION NO. : 09/338095
DATED : May 3, 2005
INVENTOR(S) : Robert H. Heil It is certified that error appears in the above-identified patent and that said Letters Patent is hereby corrected as shown below:

Title Page (cont'd)
Those longitudinally extending portions of the sheet include pleat-like portions of the sheet each having opposite major surfaces generally parallel with the axis of the roll, which pleat-like portions are superimposed major surfaces to major surfaces to form a laminate with outermost ones of the superimposed pleat like portions defining the opposite outer surfaces of the laminate.--

Signed and Sealed this

Twenty-seventh Day of November, 2007

JON W. DUDAS
*Director of the United States Patent and Trademark Office*